3,304,198
PROCESS FOR PREPARING OLEOPHOBIC AND HYDROPHOBIC FIBER AND FIBER PREPARED THEREWITH
Cyril Woolf, Morristown, and Jerome Hollander, Parsippany-Troy Hills Township, Morris County, N.J., assignors to Allied Chemical Corporation, New York, N.Y., a corporation of New York
No Drawing. Filed Oct. 28, 1963, Ser. No. 319,514
16 Claims. (Cl. 117—161)

This invention relates to new oleophobic and hydrophobic fibers and, more particularly, to new fibers containing a fluorinated acrylate polymeric ester as fiber impregnator.

It has been long desired to develop a fiber impregnator which would impart to conventional fabrics the highly desirable properties of oleophobicity and hydrophobicity. In the search for such a fabric impregnator, investigation has recently been centered upon various fluorochemicals selected from the family of fluorinated methacrylates and acrylates.

Heretofore, however, it had been believed that minimum effectiveness would only be secured by employing fluorinated polyacrylates and polymethacrylates comprised of a fluorinated chain of at least 4 carbon atoms terminated by a perfluoromethyl group, as shown in a recent publication of American Dyestuff Reporter, September 17, 1962, vol. 51, pages 46–48 which states "It has been determined that to obtain oil repellency, the compound must have a fluorinated carbon chain of at least four carbons terminated by by a —$CF_3$ group." The desirability and need, therefore, of a simple fluorinated polyacrylate or polymethacrylate derivative containing perfluorohalomethyl groups as a suitable replacement for the complex and highly expensive fluorinated polyacrylate derivatives has been long recognized.

It is a principal object of the present invention to provide fibers possessing a high degree of oleophobicity and hydrophobicity.

It is a further object of the present invention to provide a new fiber impregnator derived from fluorinated polyacrylates and polymethacrylates.

It is still a further object to provide a process for the impregnating of fibers with fluorinated polyacrylates and polymethacrylates in the preparation of oleophobic and hydrophobic materials.

Other objects and advantages will become apparent from the following description.

In accordance with the present invention an oleophobic and hydrophobic fiber may be produced by impregnating a fiber with a fluorinated acrylic polymer derived from a compound having the formula:

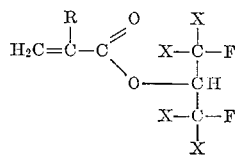

wherein R is a member selected from the group consisting of hydrogen and methyl and X is a halogen selected from the group consisting of chlorine and fluorine. These fluorinated acrylic polymers are usually hard, water-white solids.

Illustrative of the fluorinated acrylate and methacrylate monomers of the present invention are:

1,1,3,3-tetrachloro-1,3-difluoroisopropylacrylate
1,1,3,3-tetrachloro-1,3-difluoroisopropylmethacrylate
1,1,3-trichloro-1,3,3-trifluoroisopropylacrylate
1,1,3-trichloro-1,3,3-trifluoroisopropylmethacrylate
1,3-dichloro-1,1,3,3-tetrafluoroisopropylacrylate
1,3-dichloro-1,1,3,3-tetrafluoroisopropylmethacrylate
1-monochloro-1,1,3,3,3-pentafluoroisopropylacrylate
1-monochloro-1,1,3,3,3-pentafluoroisopropylmethacrylate
hexafluoroisopropylacrylate
hexafluoroisopropylmethacrylate These monomers may be prepared by reacting the corresponding halogenated isopropyl alcohol with an acrylyl chloride or methacrylyl chloride in the presence of a suitable solvent and a catalyst. A typical reaction for producing the desired fluorinated acrylate or methacrylate derivatives comprises reacting the corresponding halogenated isopropyl alcohol with the methacrylyl chloride or acrylyl chloride in solution in the presence of a solvent and a catalyst with heating at moderate temperature, i.e. from about room temperature up to about 120° C. with slight agitation. The resulting fluorinated polyacrylate or polymethacrylate derivative may then be isolated by conventional isolation and purification procedures. For example, excess reactants and solvent may be removed by distillation followed by purification by the addition of water followed by extraction with ether.

Polymerization of any particular fluorinated acrylate or methacrylate monomeric derivative may be effected by heating the monomer in solution with a free radical catalyst. Suitable polymerization catalysts are organic peroxides such as benzoyl peroxide. Alternately, the polymerization may be effected by exposure of the monomer or a solution thereof to ultra-violet light. The resulting florinated polyacrylate or polymethacrylate is then washed free of any side reaction contaminants or, if desired, may be redissolved in a suitable solvent followed by conventional filtration, distillation and drying procedures.

The fibrous material which may be subject of oleophobic and hydrophobic treatment with the fluorinated polyacrylate or polymethacrylate derivatives may be selected from a wide and conventional group of materials. For example, natural inexpensive fibers such as cotton, wool, cellulose, polyesters such as "Dacron," synthetic fibers such as nylon and "Caprolactam" polyamides and fibrous polyacrylonitriles are ready rendered waterproof, flame retardant, resistant to mild acids, perspiration, oil, moisture, mayonnaise, gasoline, grease and the influences of tropical and arctic temperatures when treated in the manner described by the present invention. The fibers may be impregnated as such or in the form of fabricated items such as fabrics, napkins, towels, etc.

The impregnation of these various fibers by the subject fluorinated polyacrylate and polymethacrylate derivatives may be effected by preparing a reaction mixture comprised of the polymeric fluorinated fiber impregnator and a suitable solvent. Although conventional processes effecting intimate contact of the fiber with the fluorinated fiber impregnators, such as spraying, etc., may successfully be employed, it is preferred to utilize a solvent-immersion system.

Illustrative of suitable solvents are: acetone, methyl ethyl ketone, tetrahydrofuran, and diethyl ether.

The weight ratio of solvent to polymeric fiber impregnator may vary over a wide range, i.e., from about 0.1 to 100 parts solvent per part fluorinated polyacrylate or polymethacrylate. In preferred operation from about 1 to 50 parts of solvent per part fiber impregnator are employed. Under these conditions of concentration, the resulting fiber normally realizes from about a 2 to 12% weight increase. As can readily be appreciated, the concentration of the polymer in the solvent directly influences the degree of coating effected.

Generally speaking, the impregnating of fibers necessitates the presence of a wetting agent due to the inability of conventional impregnators to penetrate the fiber. It has been found, however, that the fluorinated polyacrylate and polymethacrylate derivatives of the present invention exhibit a remarkable degree of wetting ability so as to eliminate the need for these expensive wetting agents. This inherent ability to penetrate the fibrous material is exhibited to even a greater degree in those cases wherein fluorinated polyacrylate or polymethacrylate containing a chlorine substituent is utilized. It is believed that the presence of a chlorine atom greatly enhances both the solubility and wetting ability of the subject fluorinated fiber impregnators. Moreover, these chlorine derivatives of the fluorinated polyacrylates and polymethacrylates have been found to preserve the hand or feel qualities of fibrous materials such as wool and cotton. It should not be assumed, however, that wetting agents cannot be used in the practice of this invention. Their use, in particular with the chlorofluorinated polyacrylates and polymethacrylates, imparts no significant advantage.

An alternative method for rendering conventional fibrous material oleophobic and hydrophobic, is the carrying out of the polymerization of the fluorinated monomeric acrylate or methacrylate in the presence of the fiber. A typical operation of this aspect of this process comprises impregnating the fiber with a reaction mixture of the monomeric fluorinated acrylate or methacrylate and catalyst, the mixture preferably being presented to the fiber or manufactured item in solution form. The impregnated fiber is then subjected to polymerization conditions such as referred to until polymerization to a desired degree has been effected.

The resulting oleophobic and hydrophobic fiber is isolated by the removal of the solvent or the excess fluorinated acrylate or methacrylate polymer by conventional methods, such as squeezing and wringing, followed by air or oven drying at ambient or high temperature as up to about 150° C., either at atmospheric pressure or under vacuum, at which there is little or no physical or chemical deterioration of the fibrous material.

The following examples are given for the purpose of illustrating the present invention and are not to be construed as a limitation thereof. In the examples, parts are by weight.

*Example 1*

To a cooled vessel containing 18.5 parts of hexafluoroisopropyl alcohol was added, in dropwise fashion, 10.5 parts of methacrylyl chloride. The resulting reaction mixture was slightly agitated at room temperature for 0.5 hour followed by refluxing for a period of 12 hours. 50 parts of pyridine, as catalyst and solvent, were added to the reaction mixture followed by heating for a period of five hours at a temperature range of 70° to 100° C. The resulting reaction mixture containing hexafluoroisopropyl methacrylate, excess reactants, and pyridine was then poured into 200 parts of water cooled to a temperature of about 5° C. followed by extraction with ether. The ether extracts were washed with a dilute aqueous solution of hydrochloric acid then water washed. A dilute aqueous sodium carbonate solution was added to neutralize any trace of hydrochloric acid and then removed by additional water washings. Removal of water from the ether solution containing hexafluoroisopropyl methacrylate was effected by the addition of sodium sulfate anhydride followed by removal of the ether by distillation. The resulting crude hexafluoroisopropyl methacrylate was a brown liquid to which was added p-tertiarybutyl catechol, as polymerization inhibitor, followed by redistillation. 6.5 parts of hexafluoroisopropyl methacrylate as a clear, colorless liquid having a boiling point of 26° to 28° C./53 mm. were obtained.

6.5 parts of hexafluoroisopropyl methacrylate so prepared was admixed with 0.07 part of benzoyl peroxide and placed in a combustion tube, degassed 4 times and then sealed. The sealed tube was kept in a constant temperature bath at 50° C. for 6 days. At the end of this period, a transparent, water-white solid polymer was obtained. Purification was effected by dissolving in acetone followed by addition to methanol, a nonsolvent to effect precipitation. After filtering and drying, a finely divided white powder having a softening point of 210° C. was obtained.

A 6 percent by weight solution comprised of 1 part the poly-hexafluoroisopropyl methacrylate and 16 parts of acetone was then prepared. A sample of cotton cloth was then immersed once into this solution for a few seconds, then removed and air dried. The cotton cloth was reweighed and showed a 9.9 percent weight increase. Prior to impregnation with poly-hexafluoroisopropyl methacrylate, the cotton cloth sample readily adsorbed water and mineral oil. After treatment, the sample was tested to determine its hydrophobic and oleophobic properties. The treated fabric was completely hydrophobic. After spilling water thereon, the water beaded and remained upon the fabric as beads until complete evaporation was effected. Likewise, "3 in 1" lubricating oil also beaded when placed upon the treated cotton material and, after a period of 8 hours, exhibited no trace of adsorption. The polyhexafluoroisopropyl methacrylate-impregnated cotton cloth also exhibited complete stain-immunity to mayonnaise, catsup and mustard.

*Example 2*

To a cooled vessel containing 28.0 parts of sym-tetrafluorodichloroisopropyl alcohol, was added 11.8 parts of acrylyl chloride in a dropwise manner with constant stirring. The resulting reaction mixture was agitated for an additional 0.5 hour at room temperature followed by heating at reflux temperature (140° C.) for an additional 5 hours. The resulting reaction mixture containing sym-tetrafluorodichloroisopropyl acrylate was poured into cold water followed by extraction with ether. The ether extracts were washed with a dilute aqueous solution of sodium carbonate in order to neutralize any trace amounts of hydrogen chloride by-product. The neutralized reaction mixture was then dried over anhydrous sodium sulfate and the ether removed by distillation. The crude sym-tetrafluorodichloroisopropyl acrylate was purified by redistillation. 24.3 parts sym-tetrafluorodichloroisopropyl acrylate as a clear, colorless liquid and having a boiling point of 26° to 28° C. at 53 mm. of mercury were obtained.

6.4 parts of sym-tetrafluorodichloroisopropyl acrylate were then placed in a sealed, evacuated glass tube and irradiated with ultra-violet light for a period of 19 hours. The resulting sym-tetrafluorodichloroisopropyl acrylate polymer was a clear, water-white solid, insoluble in carbon tetrachloride, chloroform and carbon disulfide but soluble in ether and acetone. Elemental analysis of the polymer showed 27.8% chlorine which is identical to the theoretical value.

A 6% solution comprised of 0.27 part of sym-tetrafluorodichloroisopropyl acrylate polymer dissolved in 4.3 parts of acetone was prepared. A piece of cotton cloth was only once immersed into this solution and air dried. The finished cotton cloth was completely repellent to water. "3 in 1" lubricating oil was spilled on the treated cotton cloth and immediately beaded and after 8 hours no oil adsorption was observed. The treated cotton cloth also exhibited stain-immunity to mayonnaise, catsup and mustard.

*Example 3*

To a cooled vessel containing 150.8 parts of sym-tetrafluorodichloroisopropyl alcohol was added 70.9 parts of methacrylyl chloride in a dropwise manner with constant agitation. The resulting reaction mixture was refluxed for 10 hours. At the end of this period, the reaction mixture containing sym-tetrafluorodichloroisopropyl methacrylate was added to cold water and extracted with ether. The ether extracts were washed with a dilute aqueous solution of sodium carbonate to neutralize any trace amount of hydrogen chloride by-product. The ether solution containing sym-tetrafluorodichloroisopropyl methacrylate was segregated from its aqueous phase and dried over anhydrous sodium sulfate. The ether was then removed by distillation and the crude sym-tetrafluorodichloroisopropyl methacrylate was recovered as a yellow liquid. Purification by distillation yielded 105.3 parts of sym-tetrafluorodichloroisopropyl methacrylate as a clear, colorless liquid having a boiling point range of from about 45° C. to 116° C. under 43 mm. of mercury. Elemental analysis showed 28.3% of fluorine which is in excellent agreement with the theoretical value of 27.5%.

11.03 parts of the sym-tetrafluorodichloroisopropyl methacrylate so prepared was then placed in a sealed, evacuated tube and irradiated with ultra-violet light for a period of 19 hours. The resulting poly-sym-tetrafluorodichloroisopropyl methacrylate was a clear, water-white, hard solid.

A 6% solution of the poly-sym-tetrafluorodichloroisopropyl methacrylate was prepared by dissolving 1 part of polymer in 16 parts of acetone. A piece of cotton cloth was once immersed into the solution and air dried. The cotton cloth exhibited a 6.2% weight increase. The treated cloth was hydrophobic and oleophobic.

*Examples 4–6*

Finished pieces of paper were once immersed into the acrylic polymer solutions prepared by Examples 1, 2 and 3. In each case, the finished paper so treated was completely repellent to water. When contacted with "3 in 1" lubricating oil, the oil immediately beaded and after an 8 hour period, exhibited no signs of adsorption in each case.

Since various changes and modifications may be made in this invention without departing from the spirit thereof, the invention is deemed limited only by the scope of the appended claims.

We claim:

1. A process for the preparation of an oleophobic and hydrophobic fiber which comprises impregnating a fiber with a fluorinated acrylic polymer of a compound having the formula:

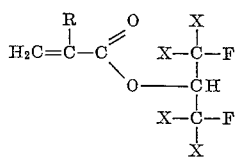

wherein R is a member of the group consisting of hydrogen and methyl and X is a halogen selected from the group consisting of chlorine and fluorine.

2. A process in accordance with claim 1 wherein the fiber is impregnated by immersion in a solvent solution of the fluorinated acrylic polymer.

3. A process in accordance with claim 1 wherein the fluorinated acrylic polymer is poly-hexafluoroisopropyl methacrylate.

4. A process in accordance with claim 1 wherein the fluorinated acrylic polymer is poly-hexafluoroisopropyl acrylate.

5. A process in accordance with claim 1 wherein the fluorinated acrylic polymer is poly-sym-tetrafluorodichloroisopropyl acrylate.

6. A process in accordance with claim 1 wherein the fluorinated acrylic polymer is poly-sym-tetrafluorodichloroisopropyl methacrylate.

7. A process for the preparation of an oleophobic and hydrophobic fiber which comprises admixing a fiber and a monomer of the formula:

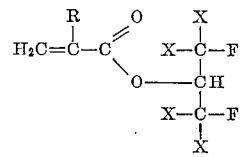

wherein R is a member selected from the group consisting of hydrogen and methyl and X is a halogen selected from the group consisting of chlorine and fluorine, and polymerizing said monomer to effect in situ polymerization of the monomer and impregnation of the fiber.

8. A process in accordance with claim 7 wherein the monomer employed is poly-hexafluoroisopropyl methacrylate.

9. A process in accordance with claim 7 wherein the monomer employed is poly-hexafluoroisopropyl acrylate.

10. A process in accordance with claim 7 wherein the monomer employed is poly-sym-tetrafluorodichloroisopropyl acrylate.

11. A process in accordance with claim 7 wherein the monomer employed is poly-sym-tetrafluorodichloroisopropyl methacrylate.

12. An oleophobic and hydrophobic fiber comprising a fiber impregnated with a fluorinated acrylic polymer derived from a compound having the formula:

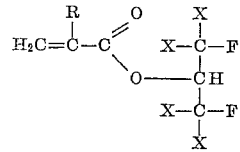

wherein R is a member selected from the group consisting of hydrogen and methyl and X is a halogen selected from the group consisting of chlorine and fluorine.

13. A fiber in accordance with claim 12 wherein the fluorinated acrylic polymer is derived from poly-hexafluoroisopropyl methacrylate.

14. A fiber in accordance with claim 12 wherein the fluorinated acrylic polymer is derived from poly-hexafluoroisopropyl acrylate.

15. A fiber in accordance with claim 12 wherein the fluorinated acrylic polymer is derived from poly-sym-tetrafluorodichloroisopropyl acrylate.

16. A fiber in accordance with claim 12 wherein the fluorinated acrylic polymer is derived from poly-sym-tetrafluorodichloroisopropyl methacrylate.

References Cited by the Examiner

UNITED STATES PATENTS

| | | | |
|---|---|---|---|
| 2,499,811 | 3/1950 | Barnes et al. | 260—89.5 |
| 2,642,416 | 6/1953 | Ahlbrecht et al. | 117—136 X |
| 2,803,615 | 8/1957 | Ahlbrecht et al. | 260—29.6 |
| 2,826,564 | 3/1958 | Bovey et al. | 260—83.5 |

WILLIAM D. MARTIN, *Primary Examiner.*

MURRAY KATZ, *Examiner.*

T. G. DAVIS, *Assistant Examiner.*